(12) United States Patent
Cai et al.

(10) Patent No.: US 7,813,106 B2
(45) Date of Patent: Oct. 12, 2010

(54) HIGH CURRENT EFFICIENCY SUPERCAPACITOR DESALINATION DEVICES AND METHODS OF MAKING THE SAME

(75) Inventors: Wei Cai, Shanghai (CN); Chang Wei, Niskayuna, NY (US); Lei Cao, Jinan (CN); Rihua Xiong, Shanghai (CN); Su Lu, Shanghai (CN); Yu Du, Shanghai (CN); Zhigang Deng, Shanghai (CN)

(73) Assignee: General Electric Company, Niskayuna, NY (US)

(*) Notice: Subject to any disclaimer, the term of this patent is extended or adjusted under 35 U.S.C. 154(b) by 906 days.

(21) Appl. No.: 11/641,579

(22) Filed: Dec. 19, 2006

(65) Prior Publication Data
US 2008/0144256 A1    Jun. 19, 2008

(51) Int. Cl.
*H01G 9/00*      (2006.01)

(52) U.S. Cl. ............... 361/502; 361/503; 361/504; 361/508; 361/512; 361/516

(58) Field of Classification Search ............. 361/502, 361/503–504, 508–512, 516–519, 523–525, 361/528–529; 205/688; 204/536, 632
See application file for complete search history.

(56) References Cited

U.S. PATENT DOCUMENTS

| | | | |
|---|---|---|---|
| 4,586,111 A | 4/1986 | Cichanowski | |
| 4,632,745 A | 12/1986 | Giuffrida et al. | |
| 5,240,572 A * | 8/1993 | Turner et al. | 205/760 |
| 5,248,401 A * | 9/1993 | Bridger et al. | 204/290.05 |
| 5,425,858 A | 6/1995 | Farmer | |
| 5,779,891 A | 7/1998 | Andelman | |
| 5,954,937 A | 9/1999 | Farmer | |
| 6,118,650 A * | 9/2000 | Maeda et al. | 361/508 |
| 6,280,599 B1 * | 8/2001 | Osvath et al. | 205/688 |
| 6,515,845 B1 * | 2/2003 | Oh et al. | 361/502 |
| 6,631,073 B1 * | 10/2003 | Sakata et al. | 361/502 |
| 6,709,560 B2 | 3/2004 | Andelman et al. | |
| 2005/0103634 A1 | 5/2005 | Andelman et al. | |

FOREIGN PATENT DOCUMENTS

| | | |
|---|---|---|
| EP | 0863520 | 9/1998 |
| GB | 1220456 A | 1/1971 |
| WO | WO02086195 A1 | 10/2002 |

OTHER PUBLICATIONS

Welgemoed et al., "Capacitive Deionization Technology™: An Alternative Desalination Solution", Desalination, vol. 183, No. 1-3, pp. 327-340, Nov. 1, 2005.
Walcarius et al., "Zeolite-Modified Solid Carbon Paste Electrodes", Journal of Solid State Electrochemistry, vol. 7, pp. 671-677, 2003.
PCT International Search Report dated Mar. 9, 2009.

* cited by examiner

*Primary Examiner*—Nguyen T Ha
(74) *Attorney, Agent, or Firm*—Mary Louise Gioeni

(57) ABSTRACT

An electrode assembly is provided. The assembly includes a chargeable electrode configured to adsorb oppositely charged ions, where the electrode comprises a porous material. The assembly further includes an ion exchange material in contact with the porous material of the chargeable electrode, where the ion exchange material is similarly charged as the chargeable electrode, and where the ion exchange material is permeable to the oppositely charged ions and at least partially impermeable to the similarly charged ions.

38 Claims, 6 Drawing Sheets

HIGH CURRENT EFFICIENCY SUPERCAPACITOR DESALINATION DEVICES AND METHODS OF MAKING THE SAME

BACKGROUND

The invention relates generally to the field of supercapacitive desalination, and more particularly to supercapacitor desalination devices having high current efficiency, and methods of making the same.

Generally, supercapacitor desalination devices employ a pair of electrodes of reverse polarity. During a charging step, a feed stream is allowed to flow through the supercapacitor desalination device. The ionic species in the feed stream are adsorbed on the surface of the oppositely charged electrodes, thereby de-ionizing the feed stream to produce a dilute output. During a discharging step, the ionic species are desorbed from the surface of the electrodes and into the feed stream to produce a concentrate output.

Further, ions having the same charge as that of the electrodes (hereafter referred to as similarly charged ions) are present inside the pore volume of the porous material of the electrodes. During the charging step, once the voltage is applied some of these similarly charged ions may be expelled from the electrode and be added into the feed stream. This undesired migration of the pore volume ions consumes extra current and adds to the impurity of the feed stream. In such cases, purification of the feed stream can only occur when an excess of feed ions, over and above ions that are expelled from the pore volumes, are adsorbed by the electrodes. On the contrary, during the discharging step, besides desorption of the oppositely charged ions from the porous electrode to the feed stream, some of the similarly charged ions in the feed stream may also be adsorbed into the pore volume. Although, the adsorption of the similarly charged ions occurs at all concentrations but gets worse at higher concentrations.

Thus, there exists a need for a supercapacitor desalination device that has controlled migration of similarly charged ions.

BRIEF DESCRIPTION

In accordance with one aspect of the invention, an electrode assembly is provided. The assembly includes a chargeable electrode configured to adsorb oppositely charged ions, where the electrode comprises a porous material. The assembly further includes an ion exchange material in contact with the porous material of the chargeable electrode, where the ion exchange material is similarly charged as the chargeable electrode, and where the ion exchange material is permeable to the oppositely charged ions and at least partially impermeable to similarly charged ions.

In accordance with another aspect of the invention, a supercapacitor desalination device is provided. The device includes a pair of oppositely charged electrodes, where at least one of the oppositely charged electrodes comprises an ion exchange material that is selectively permeable to charged ions.

In accordance with yet another aspect of the invention, a method of making an electrode assembly is provided. The method includes forming a mixture of an electrode material and an ion exchange material, dispensing the mixture in a solvent to form a paste, and molding the paste to form the electrode assembly.

In accordance with yet another aspect of the invention, a method of making an electrode assembly is provided. The method includes forming a mixture of an ion exchange material and a binder, and coating the mixture on a porous electrode.

In accordance with another aspect of the invention, a method of making an electrode assembly is provided. The method includes forming a polymerizable material and coating the polymerizable material on a surface of a porous electrode to form a polymer coating.

These and other features, aspects, and advantages of the invention will become better understood when the following detailed description is read with reference to the accompanying drawings.

DRAWINGS

DETAILED DESCRIPTION

Figure 1:
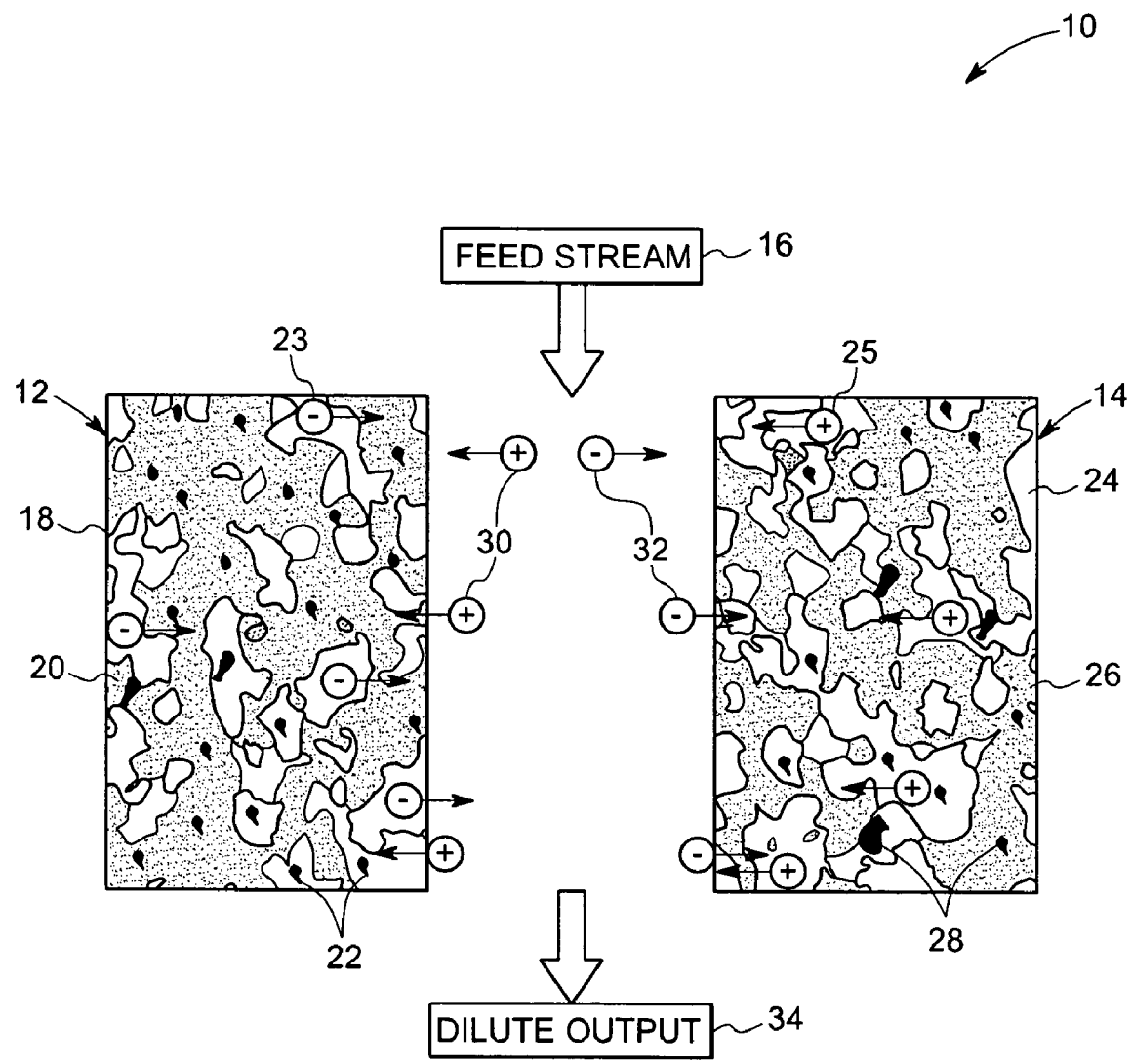
FIG. 1 is a schematic view of a supercapacitor desalination device in accordance with embodiments of the invention.

As will be described in detail below with regard to embodiments of the present technique, an electrode assembly for use in supercapacitive desalination applications is provided. The electrode assembly includes a chargeable electrode configured to adsorb oppositely charged ions. As used herein, the term "chargeable electrode" refers to an electrode that is configured to be charged upon application of the voltage. The electrode is made of a porous material that may include similarly charged ionic species, that is, the ionic species that have the same charge as that of the electrode in the charging step of the supercapacitor desalination device. For example, in case of a negative electrode, negatively charged ionic species are present in the pore volume of the negative electrode. The similarly charged ionic species may be disposed in pore volumes of the porous material that forms the charged electrode. As used herein, the term "pore volume" refers to volume or open spaces inside the porous material. In the charging step of the device a feed stream having ionic impurities is allowed to flow between a pair of charged electrodes. As used herein, the term "charging step" refers to a step during the operation of the supercapacitor desalination device in which the electrode assemblies, namely the positive electrode assembly and the negative electrode assembly, employed in the device are configured to attract and adsorb oppositely charged ions from the feed stream to produce a dilute output which has substantially less concentration of ionic species as compared to the input feed stream. The charged electrodes are configured to adsorb oppositely charged ions from the feed by ionic interaction. For example, if the charged electrode is a positive electrode, the charged electrode is configured to adsorb anions on the surface.

The electrode assembly further includes an ion exchange material in contact with the porous material of the charged electrode. The ion exchange material is permeable to the oppositely charged ions present in the feed stream. As used herein, the term "permeable" refers to a property of the ion exchange material that allows the ionic species to pass through a layer or a coating of the ion exchange material to reach the surface of the electrode underlying the ion exchange material. In certain embodiments, the ion exchange material is at least partially impermeable to the similarly charged ions. In other words, the ion exchange material prevents the similarly charged ions from migrating into the pore volumes of the porous material from the feed stream during the discharging step and also eliminates the chance for the similarly charged ions to leave the electrode and escape into the feed stream during the charging step. As used herein, the term "discharging step" refers to a step during the operation of the supercapacitor desalination device in which the electrode assemblies are configured to desorb the ionic species that were adsorbed by the electrode assembly in the charging step. In some embodiments, only one of the positive electrode or negative electrode may have the ion exchange material. In other embodiments, the ion exchange material may be disposed on both the electrodes.

In some embodiments, the ion exchange material may be at least partially disposed within the body of an electrode. In these embodiments, the ion exchange material may be mixed with the material of the electrode while forming the electrode. In certain embodiments, the ion exchange material may be in a range of about 1 percent to about 70 percent of the total weight of the electrode material. In an exemplary embodiment, the amount of the ion exchange material is about 30 weight percent of the total weight of the electrode material. In one embodiment, the ion exchange material comprises particles having a size in a range from about 0.1 micron to about 10 microns. Smaller particle size may be desirable when the ion exchange material is disposed within the electrode.

In some embodiments, the ion exchange material may be present on the entire circumferential area of the electrode. In other embodiments, the ion exchange material may be present only in a portion of the circumferential area of the electrode. In one embodiment, the ion exchange material may be present in the form of one or more layers. The one or more layers of the ion exchange material may be directly deposited on the electrode. Alternatively, the one or more layers of the ion exchange material may be formed separately and subsequently coupled to the electrode. Additionally, the one or more layers may have same or different ion exchange materials.

In some embodiments, the electrode may have a first ion exchange material at least partially disposed within the electrode and a layer of a second ion exchange material disposed at least on a portion of a surface of the electrode. The first and second ion exchange materials may be same or different. In other embodiments, one of the electrodes may have the ion exchange material disposed in the body of the electrode, and the other electrode may have the ion exchange material disposed on the surface of the electrode.

FIG. 1 is a schematic illustration of a supercapacitor desalination device 10 in a charging step. The device 10 includes negative and positive electrode assemblies 12 and 14, respectively. Each of the electrode assemblies 12 and 14 includes a charged electrode and an ion exchange material. A feed stream 16, having ionic species as one of the impurities, flows through the electrode assemblies 12 and 14. At least a part of the ionic species is adsorbed by the assemblies 12 and 14 in the charging step of the device 10 to produce a dilute output 34 which has a lower concentration of the ionic species as compared to the feed stream 16. As illustrated, the electrode assembly 12 includes a negative electrode 18 which is formed of a porous material 20. The electrode assembly 12 further includes a cation exchange material 22 in contact with the porous material 20 of the negative electrode 18. As used herein, the term "cation exchange material" refers to a material that is negatively charged and allows cations 30 to pass through, but at least partially blocks anions 23 from passing through. Suitable materials for the negative electrode 18 may include carbon, activated carbon, graphite, porous carbon particles, carbon aerogel, carbon nanotubes, carbon fabric, carbon fibers, or combinations thereof. Examples of cations 30 may include sodium, calcium, magnesium, potassium and proton. As will be appreciated, in the charging step, the similarly charged ions, that is, anions 23 present in the negative electrode 18 experience repulsive forces due to both the anions 23 and the negative electrode 18 having negative charges. The cation exchange material 22 may also be present partially on the surface of the negative electrode 18. By application of the cation exchange material 22, at least some of the anions 23 originally present in the negative electrode 18 may be prevented from being expelled out of the negative electrode 18. The free positive ions present in the ion exchange material are configured to bond with the anions 23, thereby preventing the anions 23 from leaving the negative electrode 18. The cation exchange material 22 also adsorbs the cations 30 from the feed stream 16.

Similarly, the positive electrode assembly 14 includes a positive electrode 24 having a porous material 26. The assembly 14 further includes an anion exchange material 28 that is disposed within the body of the positive electrode 24. As used herein, the term "anion exchange material" refers to a material that is positively charged and allows anions 32 to pass through, but at least partially blocks the similarly charged ions, that is, cations 25 from passing through. Suitable materials for the positive electrode 24 may include carbon, activated carbon, graphite, porous carbon particles, carbon aerogel, carbon nanotubes, carbon fabric, carbon fibers, or combinations thereof. Examples of anions 32 may include but not limited to chlorine, sulphate ion, carbonate ion, bicarbonate ion and hydroxide ion. The anion exchange material 28 may be present partially on the surface of the positive electrode 24. The anion exchange material 28 prevents the cations 25 from being expelled out of the positive electrode 24 due to the repulsive ionic forces.

Figure 2:
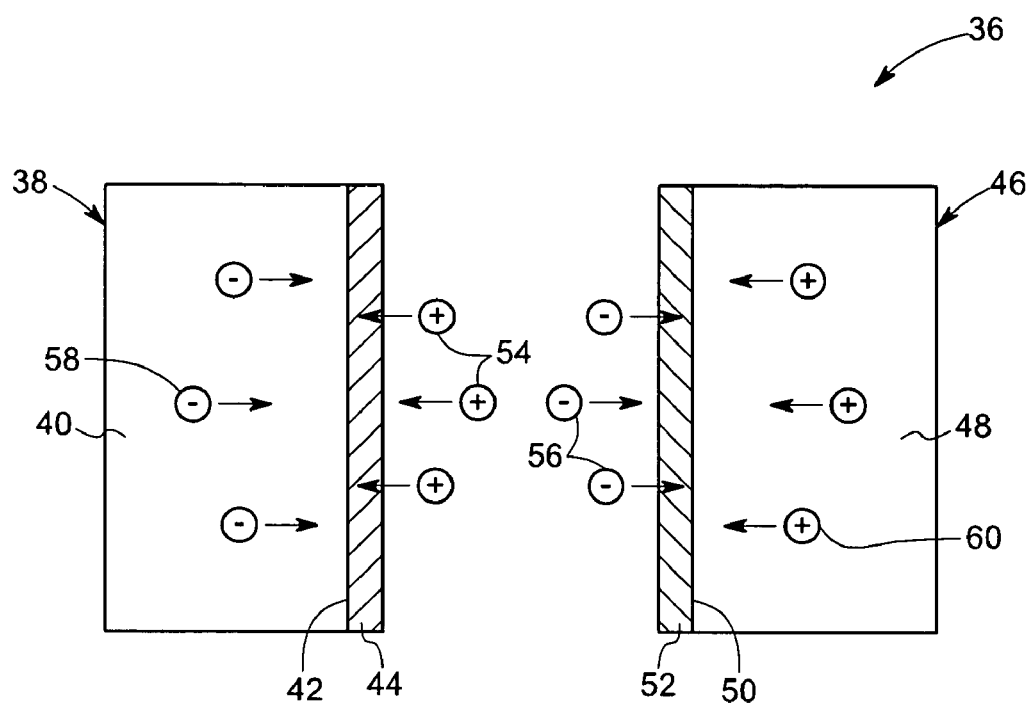
FIGS. 2-3 are cross-sectional views of a supercapacitor desalination device in accordance with embodiments of the invention.

Although, the presently contemplated embodiment embodies the ion exchange materials 22 and 28 as being disposed at least partially within the body of the electrodes 18 and 24, the ion exchange material also may be present in the form of a layer on the surface of the charged electrode, such as the negative electrode 18 or the positive electrode 24, or both (FIG. 2). In this embodiment, the ion exchange material may or may not be present in the body of the electrodes 18 and/or 24. When employing the ion exchange material in the form of an outer coating or a layer, at least some of the cations and the anions present in the feed stream are adsorbed by the oppositely charged electrodes. Hence, subsequent to the adsorption of the ions by the ion exchange material, the ions permeate through the ion exchange material and reach the surface of the respective electrodes. As a result, the surface of the ion exchange material becomes available for the ions in the upcoming feed stream. In conventional supercapacitor desalination devices, the available area on the electrode for adsorption of ions reduces over time during a charging cycle. This reduction in the available area of the electrodes decreases the efficiency of the electrode to adsorb ionic species in the feed stream. Also, while in operation the ionic species in the electrode, which are similarly charged as the charge of the electrode, may be repelled out due to ionic forces. These repelled ions from the electrode mix with the feed stream and increase the ionic concentration in the dilute output. The free ions present in the ion exchange material couple with the similarly charged ions of the electrode, which are under repulsive forces, thereby preventing these similarly charged ions from being expelled out of the electrode.

Turning now to FIG. 2, an embodiment of a supercapacitor desalination device 36 is illustrated. The supercapacitor desalination device 36 includes an electrode assembly 38 that is configured to act as a negative electrode assembly in the charging step of the device 36. The electrode assembly 38 includes an electrode 40 having a surface 42. The electrode 40 is configured to be negatively charged in the charging step of the device 36. The assembly 38 also includes a cation exchange material in the form of a layer 44. As illustrated, such a layer 44 may be disposed on a surface of the electrode 40, such as the surface 42 of the electrode 40. In one embodiment, the layer 44 may be a single layer. In another embodiment, the layer 44 may be a combination of two or more layers of same or different ion exchange materials. In the illustrated embodiment, the device 36 further includes a positive electrode assembly 46. The positive electrode assembly 46 includes a positive electrode 48 that has an anion exchange layer 52 with a surface 50. The anion exchange layer 52 adsorbs anions 56 and at least partially prevents cations 60 from leaving the positive electrode 48. Similarly, the cation exchange layer 44 adsorbs cations 54 and at least partially prevents anions 58 from leaving the negative electrode 40.

Figure 3:
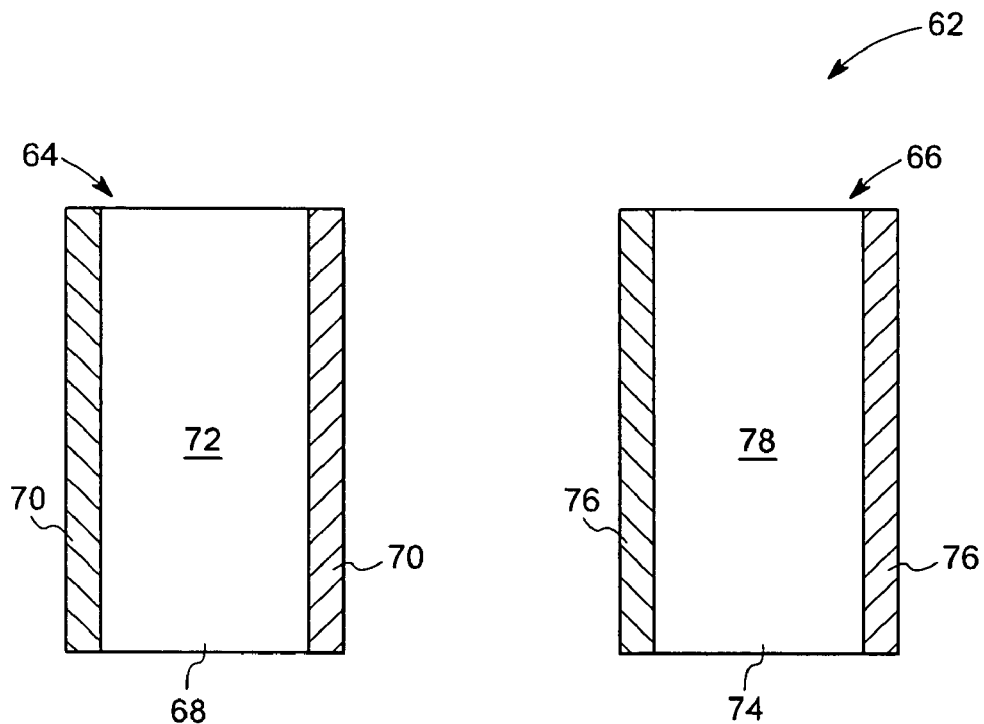

Referring now to FIG. 3, a cross-sectional view of a supercapacitor desalination device 62 having electrode assemblies 64 and 66 is illustrated. The negative electrode assembly 64 includes a negative electrode 68 having a cation exchange material 70 disposed on the surface 72 of the negative electrode 68. The cation exchange material 70 may be formed in the form of a layer or a membrane. Similarly, the positive electrode assembly 66 includes a positive electrode 74 and an anion exchange material 76 disposed on a surface 78 of the positive electrode 74. The electrodes 68 and 74 have the ion exchange materials 70 and 76 on all sides, as opposed to the illustrated embodiment of FIG. 2, where the ion exchange materials 44 and 52 are disposed on only the side of the electrodes 40 and 48 that are exposed to the feed stream.

In certain embodiments, the electrodes, such as electrodes 40, 48, 68 and 74 may be employed in stacked structures in a supercapacitor desalination device. In stacked structures, a plurality of the pairs of such electrodes may be disposed in the form of a stack. Further, an insulator may be disposed between each of the pair of electrodes. For the purpose of purification of a liquid by de-ionization, several of such cells may be configured in the form of a stack that has provisions for water inlet and outlet. In certain embodiments, the feed liquid may be passed through the stack more than one time, that is, more than one iteration may be used to de-ionize the liquid to permissible or desirable levels of charged species. In certain embodiments, a plurality of pair of electrodes may be arranged in a stack such that the output of one pair of electrodes may be treated as a feed liquid for the other cell. This way, the liquid may be allowed to pass through the electrode pairs several times before coming out of the outlet.

Figure 4:
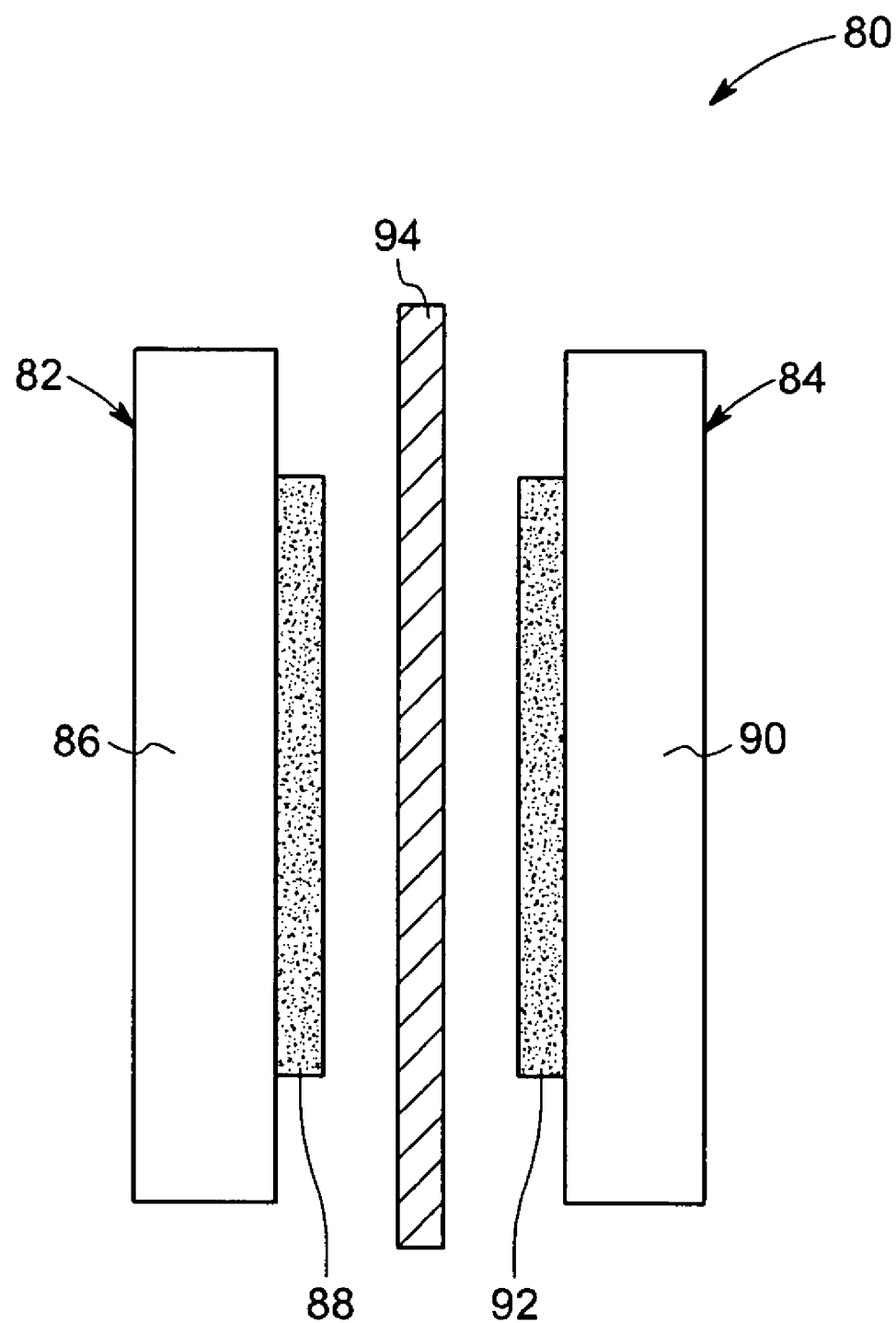
FIG. 4 is a cross-sectional view of a supercapacitor desalination device in accordance with embodiments of the invention.

FIG. 4 illustrates an embodiment of a supercapacitor desalination device 80. The device 80 includes a pair of electrode assemblies having a negative electrode assembly 82 and a positive electrode assembly 84. The negative electrode assembly 82 includes a negative electrode 86 having a cation exchange material in the form of a membrane 88, and the positive electrode 84 includes a positive electrode 90 having an anion exchange material in the form of a membrane 92. The membranes 88 and 92 are physically insulated from each other by employing an insulator 94. In certain embodiments, the cationic and anionic polymer of the anion and cation exchange materials 92, 88 may be coated on two separators individually. Subsequently, the polymers may be cured by applying a certain temperature. Next, the ionic polymer coated separators may be disposed adjacent to a spacer 94 to form a flow channel. This module having an arrangement of a separator-spacer-separator may be disposed between two electrodes to form a pair of electrode assemblies. The provision of having a separate module for ion exchange materials may simplify assembly process. Further, this modular design also may be convenient for the flush and replacement of the ion exchange material from the electrode. Other advantages may include increased component flexibility, i.e., electrodes and spacer may be manufactured separately, spacers are lighter and easier to handle than electrodes, a variety of coating methods may be applied, such as dip coating, blade coating, spray coating, lamination, because of the flexibility of the spacer.

Exemplary systems fabricated in accordance with this embodiment yielded test results which indicated that the use of ion exchange materials resulted in improved current efficiency and energy efficiency of the supercapacitor desalination devices. In some embodiments, the electrical resistance of the ion exchange material disposed on the electrode in the form of a layer is in a range from about 0.1 Ohm cm$^2$ to about 50 Ohm cm$^2$. In one embodiment, there is no voltage applied to the ion exchange material during the operation of the device. Further, improvements may be achieved by polymer selection of the ion exchange material. For example, a combination of both cationic and anionic ion exchange materials may yield a different result in comparison to employing only one of the two anionic or cationic ion exchange materials. The improvement in current and/or energy efficiency may also be achieved by selecting an optimum thickness or percentage, as the case may be, for the ion exchange material in the electrode.

In certain embodiments, the current efficiency of the supercapacitor desalination device is in a range from about 40 percent to about 99 percent. The current efficiency may be correlated to the amount of ion exchange material present in the electrode assembly. Exemplary systems fabricated in accordance with this embodiment yielded test results, which indicated that a increase in the amount of an cation exchange material employed in the electrode assembly resulted in increase in the current efficiency. In these tests, the cation exchange material was employed on the negative electrode in the form of a coating. For example, for the cation exchange material loading of about 0-5 mg/cm$^2$ the current efficiency is about 40 percent, for the cation exchange material loading of about 12.5 mg/cm$^2$ the current efficiency is about 55 percent, for the cation exchange material loading of about 37.5 mg/cm$^2$ the current efficiency is about 70 percent, and for the cation exchange material loading of about 75 mg/cm$^2$ the current efficiency is about 75 percent. Similarly, for positive electrode, when no anion exchange material is employed the current efficiency is about 40 percent, whereas when an anion exchange material is employed in the amount of 12.5 mg/cm$^2$ the current efficiency is appreciated to 50 percent, when the anion exchange material is applied in an amount 37.5 mg/cm$^2$ the current efficiency is about 60 percent. When both the negative electrode and positive electrode employ the ion exchange materials the current efficiency may be higher than the instances where only one of the electrodes employ an ion exchange material. In one example, employing an anion exchange material of about 37.5 mg/cm$^2$ on the positive electrode, and employing the same amount of cation exchange material on the negative electrode results in a current efficiency of more than about 80 percent.

In certain embodiments, one or more conducting polymers may be employed as the ion exchange material. Non-limiting examples of such conducting polymers may include polyaniline, polypyrrole, polythiophene, and combinations thereof. The derivatives include the sulfonic, chloride, fluoride, alkyl, alkoxy, and phenyl substitutes. The conducting materials may be employed in the form of coatings on the positive electrode.

In other embodiments, one or more ionic-conducting polymers may be employed as ion exchange materials. Non-limiting examples of ionic-conducting polymers may include a homopolymer, a random copolymer, a graft copolymer and/or a block copolymer. The copolymer may be a product of one or more ionic or non-ionic monomers. In one embodiment, the ionic-monomer may include one or more anionic monomers as cation exchange material. In another embodiment, the ionic monomer may include one or more cationic monomers as the anion exchange material. The ion exchange material may be a product polymer of one or more ionic monomers. Examples of anionic monomers include compounds such as sulphonates, phosphonates, carboxylates, borates, or combinations thereof. Examples of cationic monomers include salts of primary amines, secondary amines, tertiary amines, or quarternary ammoniums, imidazoliums, guanidiniums, pyridiniums, or combinations thereof. Non-limiting examples of non-ionic monomers may include styrene, acrylates, methacrylates, acrylamides, vinyl pyridine, vinylpyrrolidone, epoxies, aldehydes, ketones, hydroxyalkyl compounds, siloxanes, urethane, and combinations thereof.

The ionic-conducting polymers may be a cross-linked material. In an exemplary embodiment, a cross-linked polystyrenesulfonic acid is employed as a cation exchange material. The cross linked poly-styrenesulphonic acid may be formed by reacting styrene sulfonate with N,N'-Methylenebisacrylamide in presence of an initiator. Non-limiting examples of initiators may include azobisisobutylonitrile and benzoyl peroxide. The reaction may be performed at a temperature in a range of from about 30° C. to about 60° C. Subsequently, a thin coating of the polymer acid may be applied on the electrode. The coating layer may be further heated at a temperature in a range from about 30° C. to about 60° C. In another exemplary embodiment, a cross-linked poly-dimethyl-aminoethyl-methacrylate is employed as an anion exchange material. The cross-linked polydimethyl-aminoethyl-methacrylate may be formed by reacting dimethyl-aminoethyl-methacrylate with N,N'-Methylenebisacrylamide in presence of an initiator. The reaction may be performed at a temperature in a range of from about 30° C. to about 60° C. Subsequently, a thin coating of the polymer may be applied on the electrode. The thickness of the coating may be in a range of from about 0.0001 mm to about 1 mm. The thickness of the coating may be selected based on the desired electrical conductivity of the ion exchange material. Also, it is desirable to have an ion exchange material that is anti corrosive and is stable in both acidic and basic medium.

In certain embodiments, a cationic polymer for use as anion exchange material is made by reacting an amine with an epoxy and then quaternizing the reaction product with a halide. In one embodiment, a mixture is formed by mixing 4 ml of 5 percent triethylenetetramine (TETA) and 4 ml of 20 percent epoxy aqueous solution. The mixture is then placed onto a dry electrode. The electrode is then subjected to heating by for example, placing in an oven at a temperature of about 100° C. This step of placing the mixture on the electrode and heating the electrode may be repeated several times to control the amount of cation exchange material loaded on the electrode. In one embodiment, after heating the electrode at a temperature of about 100° C. for about 12 hours, the electrode is subject to a post treatment to quaternize the amine groups. In an exemplary embodiment, quarternization step may include applying an ethyl acetate solution having 5 ml of 5 percent 1,4-dibromo-2,3-butanedione on the electrode. In another embodiment, the electrode may be subjected to sulphonation to introduce sulphonic group in the ion exchange material. Subsequently, the reaction is allowed to proceed for about 30 minutes. Next, the electrode may be rinsed using de-ionization water afterwards.

Figure 5:
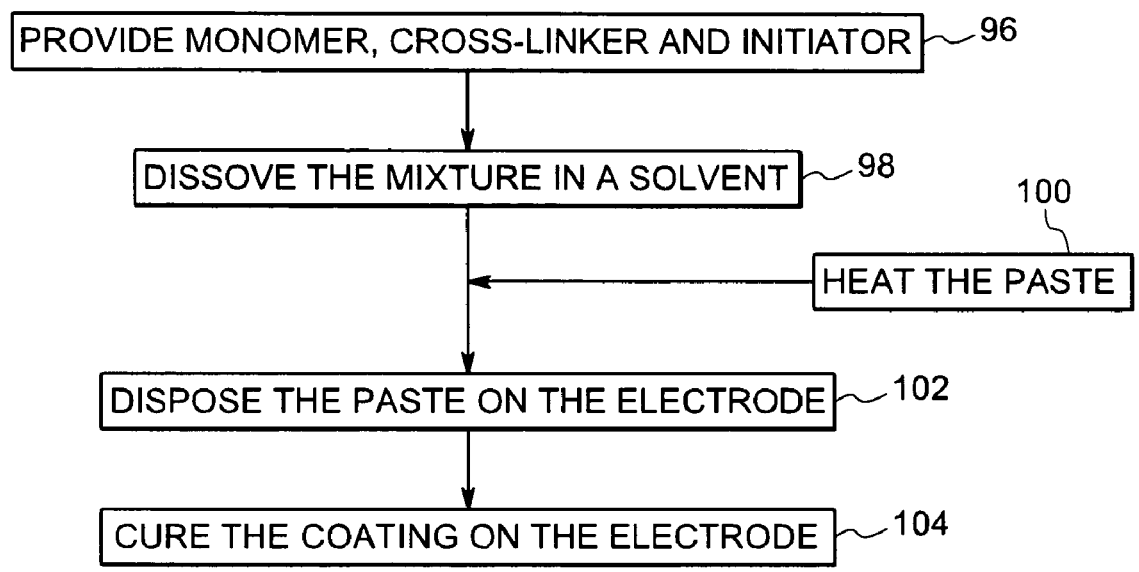
FIGS. 5-7 illustrate process steps for making an electrode having an ion exchange material in accordance with embodiments of the invention.

Referring to FIG. 5, a method of making a polymer coating of an ion exchange material is illustrated. In the illustrated embodiment, the polymer coating is formed by in-situ polymerization of the monomer on an electrode. At block 96, a polymerizable material is formed or provided. The polymerizable material may include ionic or non-ionic monomers, ionic or non-ionic oligomers, ionic or non-ionic partially polymerized polymers, ionic or non-ionic completely polymerized polymers, or combinations thereof. Optionally, when providing the polymerizable material in the form of monomers, oligomers or partially polymerized polymers, a cross-linker and/or an initiator may also be provided (block 97). In an exemplary embodiment, providing the initiator may also include providing an initiation manner such as heat or ultraviolet (UV) light. Non-limiting examples of suitable cross linkers may include divinylbenzene and N,N'-Methylenebisacrylamide. Non-limiting examples of suitable initiators may include azobisisobutylonitrile and benzoyl peroxide.

Further, at block 98, the mixture of polymerizable material and optionally cross-linker and/or initiator is dissolved in a solvent to form a paste. The mixture may be dissolved by sonification for a few minutes. Non-limiting examples of solvents may include de-ionized water, ethanol, or combinations thereof. In one embodiment, a mixture of water and ethanol may be employed as a solvent. The weight ratio of solvent in the mixture may vary from about 10 percent to about 90 percent. Additionally, gases such as oxygen present in the paste may be removed by bubbling inter gases, such as argon. At block 100, the paste was heated to facilitate dissolution of the polymerizable material, the cross linker and the initiator in the solution. The container having the paste may be heated by disposing the container in an oil bath for homogenous heating. In one embodiment, the paste was heated to a temperature in a range from about 70° C. to about 80° C. for a period of about one to about 30 minutes. The pre-polymerization is performed to increase the viscosity of the paste to about 0.1 Pa s. Subsequent to pre-polymerization, the paste may be transferred to another container. At block 102, the pre-polymerized paste is coated on the electrode to form a layer of the ion exchange material. The coating may be done by any known conventional coating techniques, such as, casting, dip coating, or screen-printing. At block 104, the paste is cured to form a coating of the ion exchange material on the electrode. During or subsequent to curing the coating, a part of the coating may infiltrate into the porous material of the electrode and form a composite electrode where the coating of the ion exchange material is present on the surface of the electrode and a portion of the ion exchange material is present within the electrode. In one embodiment, the curing may be done by placing the electrode in an oven at a temperature in a range from about 30° C. to about 40° C. for a period of about 1 hour to about 6 hours. Subsequently, the temperature of oven may be increased in a range from about 50° C. to about 70° C.

Figure 6:
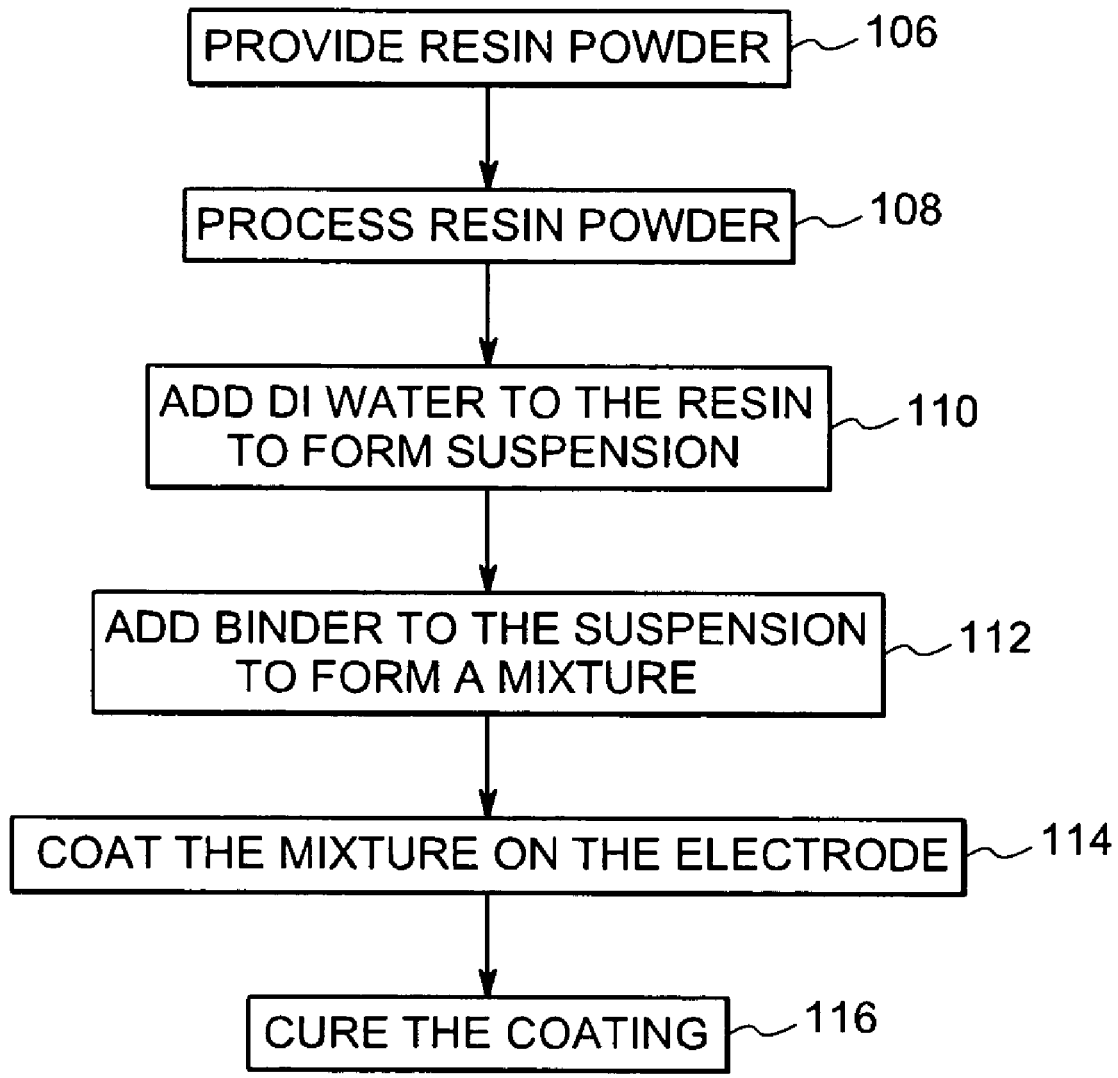

FIG. 6 illustrates a method of making an ion exchange material coating on an electrode with ion exchange resins powder. The method includes providing a resin powder (block 106). The resin powder may be commercially available. The particle size of the commercially available resin may be about 3-12 mm. Examples of commercially available cation exchange resins may include Amberlite IR-120, Dowex 50 and Diaion SK-IA. Examples of commercially available anion exchange resins may include Amberlite IRA-400 and Diaion SA-10A. At block 108, the resin may be processed to reduce the particle size to less than about 50 microns. In one embodiment, the resin may be subjected to ball milling for a period of about 2 hours to achieve the predetermined particle size. At block 110, a suspension of the resin and de-ionized water is formed. Alternatively, the suspension may be formed by employing any other suitable solvent. The ratio by weight of the resin to de-ionized water is in a range from about 1:1 to about 1:5. At block 112, a binder or a matrix material is added to the suspension to form a mixture. Examples of binders may include poly tetra fluoro ethylene (PTFE), or polyvinylidene pluoride (PVDF). The binder may be added in a water emulsion form. Further, the ration of the weight binder with respect to the weight of the resin is in a range from about 1:0.05 to about 1:0.2. Further, the mixture is stirred for a period of about 5 minutes to about 10 minutes to homogenize the mixture. At block 114, the homogenized mixture is coated on the electrode. The coating may be done by employing processes, such as spin coating, dip coating, blade coating, spray coating, lamination or screen-printing. At block 116, the coating is cured to dry the coating.

Figure 7:
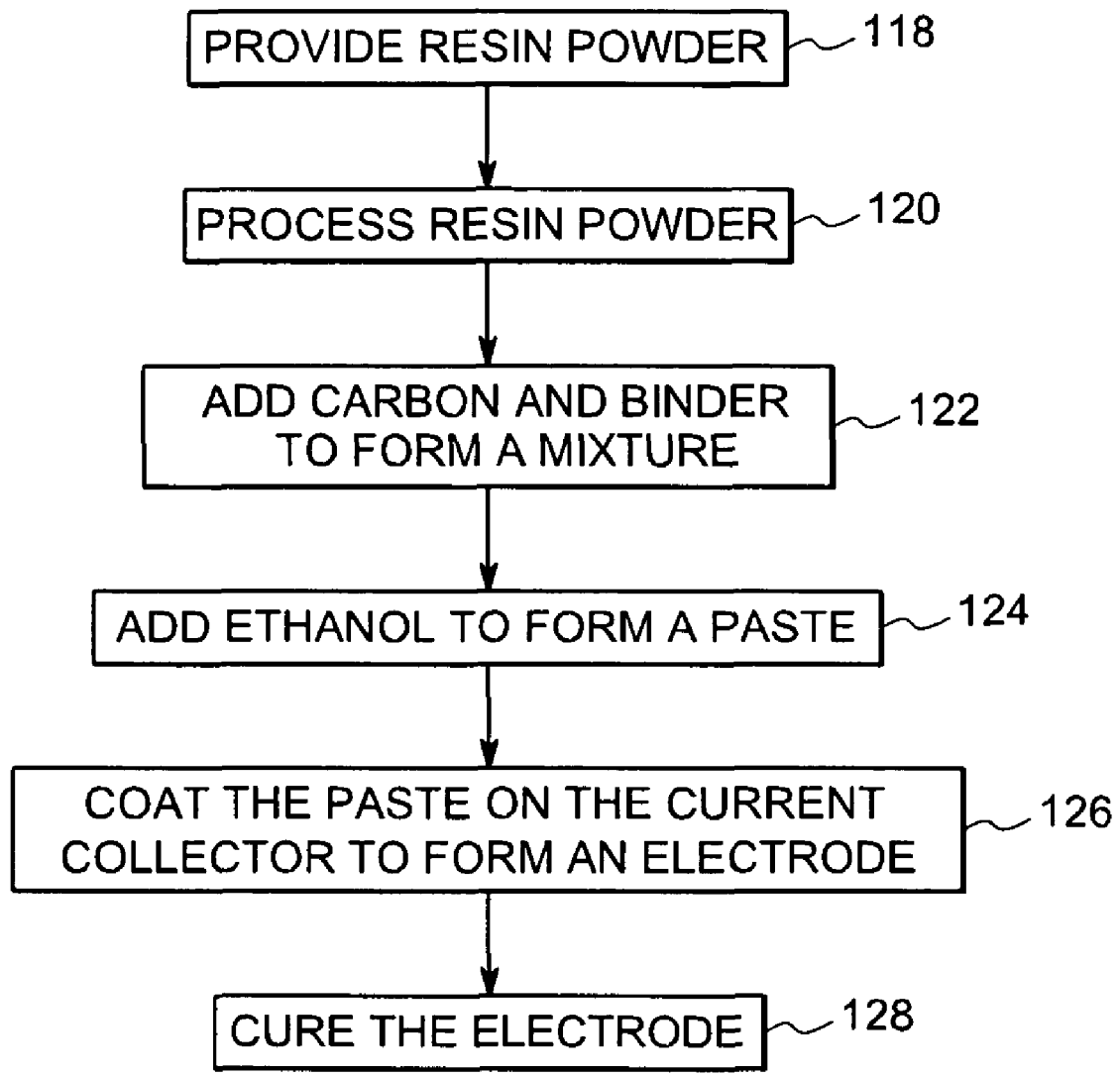

In another embodiment, the electrode material is mixed with the ion exchange material to form the electrode, as illustrated in FIG. 7. The method includes providing a resin powder (block 118). The resin powder may be commercially available as noted above with regard to FIG. 6. At block 120, the resin powder may be processed to reduce the particle size. At block 122, a binder and carbon source is added to the resin powder to form a mixture. The binders may include any of the binders listed above with regard to FIG. 6. Subsequently, at block 124, a paste is formed by adding ethanol to the mixture. The ratio by weight of the mixture and ethanol is in a range from about 1:1 to about 1:5. Further, the paste is stirred for a period of about 5 minutes to about 10 minutes to homogenize the mixture. At block 126, the homogenized paste is coated on the current collector to form the electrode. The coating may be done by employing processes, such as spin coating, dip coating, blade coating, spray coating, lamination or screen-printing. In an alternate embodiment, the paste may be molded in the form of the electrode. At block 128, the electrode is cured to dry the electrode.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. An electrode assembly, comprising:
    a chargeable electrode configured to adsorb oppositely charged ions, wherein the electrode comprises a porous material; and
    an ion exchange material in contact with the porous material of the chargeable electrode, wherein the ion exchange material is similarly charged as the chargeable electrode, and wherein the ion exchange material is permeable to the oppositely charged ions and at least partially impermeable to similarly charged ions,
    wherein the chargeable electrode is a negative electrode and wherein the ion exchange material is a cation exchange material configured to at least partially prevent anions from escaping from the pore volume of the electrode, and wherein the cation exchange material is configured to allow cations to pass through the ion exchange material.

2. The electrode assembly of claim 1, wherein the ion exchange material comprises a layer disposed on a surface of the chargeable electrode.

3. The electrode assembly of claim 2, wherein a thickness of the layer is in a range from about 0.0001 mm to about 1 mm.

4. The electrode assembly of claim 2, wherein an electrical resistance of the layer is in a range from about 0.1 Ohm $cm^2$ to about 50 Ohm $cm^2$.

5. The electrode assembly of claim 2, wherein the layer comprises a binder and a resin.

6. The electrode assembly of claim 5, wherein the resin comprises Amberlite IR-120, Dowex 50, Diaion SK-IA, Amberlite IRA-400, Diaion SA-10A, or combinations thereof.

7. The electrode assembly of claim 5, wherein the binder comprises poly tetra fluoro ethylene, polyvinylidene fluoride, or any derivaties thereof.

8. The electrode assembly of claim 1, wherein the ion exchange material comprises a binder.

9. The electrode assembly of claim 8, wherein the binder is at least partially disposed within the chargeable electrode.

10. The electrode assembly of claim 1, wherein the amount of the ion exchange material is in a range from about 1 weight percent to about 70 weight percent of the total weight of an electrode material.

11. The electrode assembly of claim 1, wherein the ion exchange material comprises particles having a size in a range from about 0.1 microns to about 10 microns.

12. The electrode assembly of claim 1, wherein the assembly is employed in a supercapacitor desalination device.

13. The electrode assembly of claim 1, wherein a current efficiency of the device is in a range from about 40 percent to about 99 percent.

14. The electrode assembly of claim 1, wherein no voltage is applied to the ion exchange material during the operation of the device.

15. The electrode assembly of claim 1, wherein the cation exchange material comprises a product polymer of anionic monomers.

16. The electrode assembly of claim 15, wherein the anionic monomer comprises anionic compound of a sulphonate, a phosphonate, a carboxylate, a borate, or combinations thereof.

17. The electrode assembly of claim 1, wherein the cation exchange material comprises a sulphonate, a phosphonate, a carboxylate or a borate of a product polymer from non-ionic monomers, or combinations thereof.

18. The electrode assembly of claim 17, wherein the nonionic monomer comprises a monomer of a styrene, an acrylate, a methacrylate, a acrylamide, a vinyl pyridine, a vinylpyrrolidone, an epoxy, a siloxane, a urethane, or combinations thereof.

19. An electrode assembly, comprising:
a chargeable electrode configured to adsorb oppositely charged ions, wherein the electrode comprises a porous material; and
an ion exchange material in contact with the porous material of the chargeable electrode, wherein the ion exchange material is similarly charged as the chargeable electrode, and wherein the ion exchange material is permeable to the oppositely charged ions and at least partially impermeable to similarly charged ions,
wherein the chargeable electrode is a positive electrode and wherein the ion exchange material is an anion exchange material configured to at least partially prevent cations from escaping from the pore volume of the electrode, and wherein the anion exchange material is configured to allow anions to pass through the ion exchange material.

20. The electrode assembly of claim 19, wherein the anion exchange material comprises cationic polymers.

21. The electrode assembly of claim 20, wherein the cationic polymer comprises salts of primary amines, secondary amines, tertiary amines, or quarternary ammoniums, imidazoliums, guanidiniums, pyridiniums, or combinations thereof.

22. The electrode assembly of claim 19, wherein the anion exchange material comprises the quarternized reaction product of a material containing tertiary amine groups.

23. The electrode assembly of claim 19, wherein the anion exchange material comprises poly-dimethyl-aminoethyl-methacrylate.

24. The electrode assembly of claim 19, wherein the anion exchange material comprises a conducting polymer material.

25. The electrode assembly of claim 24, wherein the conducting polymer material comprises polyaniline, polypyrrole, and polythiophene, or combinations thereof.

26. The electrode assembly of claim 19, wherein the ion exchange material comprises a layer disposed on a surface of the chargeable electrode.

27. The electrode assembly of claim 26, wherein a thickness of the layer is in a range from about 0.0001 mm to about 1 mm.

28. The electrode assembly of claim 26, wherein an electrical resistance of the layer is in a range from about 0.1 Ohm $cm^2$ to about 50 Ohm $cm^2$.

29. The electrode assembly of claim 26, wherein the layer comprises a binder and a resin.

30. The electrode assembly of claim 29, wherein the resin comprises Amberlite IR-120, Dowex 50, Diaion SK-IA, Amberlite IRA-400, Diaion SA-10A, or combinations thereof.

31. The electrode assembly of claim 29, wherein the binder comprises poly tetra fluoro ethylene, polyvinylidene fluoride, or any derivaties thereof.

32. The electrode assembly of claim 19, wherein the ion exchange material comprises a binder.

33. The electrode assembly of claim 32, wherein the binder is at least partially disposed within the chargeable electrode.

34. The electrode assembly of claim 19, wherein the amount of the ion exchange material is in a range from about 1 weight percent to about 70 weight percent of the total weight of an electrode material.

35. The electrode assembly of claim 19, wherein the ion exchange material comprises particles having a size in a range from about 0.1 microns to about 10 microns.

36. The electrode assembly of claim 19, wherein the assembly is employed in a supercapacitor desalination device.

37. The electrode assembly of claim 19, wherein a current efficiency of the device is in a range from about 40 percent to about 99 percent.

38. The electrode assembly of claim 19, wherein no voltage is applied to the ion exchange material during the operation of the device.

* * * * *